United States Patent
Imer

(10) Patent No.: US 10,117,445 B2
(45) Date of Patent: Nov. 6, 2018

(54) FROZEN YOGURT PROCESS

(71) Applicant: NESTEC S.A., Vevey (CH)

(72) Inventor: Sinan Imer, Bakersfield, CA (US)

(73) Assignee: Nestec S.A., Vevey (CH)

( * ) Notice: Subject to any disclaimer, the term of this patent is extended or adjusted under 35 U.S.C. 154(b) by 127 days.

(21) Appl. No.: 14/439,569

(22) PCT Filed: Oct. 31, 2013

(86) PCT No.: PCT/EP2013/072800
§ 371 (c)(1),
(2) Date: Apr. 29, 2015

(87) PCT Pub. No.: WO2014/068050
PCT Pub. Date: May 8, 2014

(65) Prior Publication Data
US 2015/0289540 A1    Oct. 15, 2015

(30) Foreign Application Priority Data
Oct. 31, 2012 (WO) ................ PCT/US2012/062822

(51) Int. Cl.
A23C 9/13 (2006.01)
A23G 9/40 (2006.01)
A23G 9/36 (2006.01)
A23C 9/123 (2006.01)
A23C 9/137 (2006.01)

(52) U.S. Cl.
CPC ............... *A23G 9/40* (2013.01); *A23C 9/123* (2013.01); *A23C 9/1307* (2013.01); *A23C 9/137* (2013.01); *A23G 9/363* (2013.01); *A23C 2260/152* (2013.01); *A23V 2002/00* (2013.01)

(58) Field of Classification Search
None
See application file for complete search history.

(56) References Cited

U.S. PATENT DOCUMENTS 5,308,628 A * 5/1994 Schol .................. A23C 9/1307
426/34
2004/0071835 A1* 4/2004 Bartkowska ............. A23G 9/04
426/101
2011/0151065 A1* 6/2011 Bartkowska .......... A21C 15/025
426/101

FOREIGN PATENT DOCUMENTS

EP    1852018    11/2007
WO    9734498    9/1997

OTHER PUBLICATIONS

Davidson et al., "Probiotic Culture Survival and Implications in Fermented Frozen Yogurt Characteristics" Journal of Dairy Science, vol. 83, No. 4, 2000, pp. 66-673.
Morand et al., "How to tailor heat-induced whey protein/k-casein complexes as a means to investigate the acid gelation of milk—a review" Dairy Science & Technology, vol. 91, 2011, pp. 97-126.
Marshall et al., "Ice Cream. Chapter 4. Composition and Properties, Fifth Edition" Jan. 2000, 25 pages, XP002282748.

* cited by examiner

*Primary Examiner* — Tamra L. Dicus
(74) *Attorney, Agent, or Firm* — K&L Gates LLP

(57) ABSTRACT

The present invention relates to a yogurt product that is frozen wherein the yogurt product comprising 50-100% fermented yogurt mix, preferably 80-100%, more preferably 90-100% fermented yogurt mix, and the degree of overrun of the mix is between 20 to 150% by volume, preferably 30-60%. The present invention also relates to a method of preparing such a product.

9 Claims, No Drawings

FROZEN YOGURT PROCESS

CROSS REFERENCE TO RELATED APPLICATIONS

The present application is a National Stage of International Application No. PCT/EP2013/072800, filed on Oct. 31, 2013, which claims priority to International Application No. PCT/US2012/062822, filed on Oct. 31, 2012, the entire contents of which are being incorporated herein by reference.

TECHNICAL FIELD OF THE INVENTION

The present invention relates to a yogurt product. In particular the present invention relates to a yogurt product comprising 50-100% fermented yogurt mix, preferably 80-100%, more preferably 90-100% fermented yogurt mix, and the degree of overrun of the mix is between 20 to 150% by volume, preferably 30-60%.

Furthermore, the invention relates to a method of preparing the yogurt product.

BACKGROUND OF THE INVENTION

Dairy products such as yogurts are popular products amongst consumers.

Chilled yogurt (not "frozen yogurt") products are normally stored and consumed at refrigerated temperatures. Unfortunately, when storing these yogurt products at freezing temperatures, the products become very icy, hard and are no longer scoopable. This is therefore not an ideal solution for the consumer of frozen dairy products. Also, "frozen yogurt" or cultured frozen dairy dessert products in the market contains only 10-30% of real yogurt, and mostly is composed of ice cream mix.

In frozen confection products such as for example frozen yoghurt, a freeze-thaw cycle generally leads to deterioration in mouth feel. Ice crystals are formed and the creamy texture is lost.

The ability to withstand freeze-thaw cycle without deterioration in texture is of great importance in the frozen confection product industry. From a producer point of view, lack of freeze-thaw stability means that temperatures along the entire distribution chain must be strictly controlled and maintained without variations. This is very energy-consuming and costly. If the product is subject to variations in temperature at some point in the distribution chain, an inferior product will be delivered. This is negative for producer, retailer and consumer.

At a consumer level, freeze-thaw stability is desirable as this affords the consumer flexibility in how much and when the product may be consumed without detracting from the quality of the product.

Thus, improved freeze-thaw stability of frozen confection products is sought after by both the producers and consumers of frozen confection products.

Furthermore, there is an increasing demand for products which are natural. Products which contain artificial emulsifiers and stabilizers may be perceived negatively by consumers, and therefore alternative solutions are sought after. However, most frozen yogurt products with creamy texture present in the market contain non-natural stabilizers and/or emulsifiers.

Furthermore, there is an existing demand from consumers of yogurt product to buy yogurt prepared from reduced, low or non-fat formulations, while maintaining their good sensorial properties such as creaminess, delivering the perception of full fat yogurt. Unfortunately, low fat alternatives tend to rely even more than higher fat alternatives on emulsifiers and stabilizers to attain a pleasant mouth feel.

The prior art discloses ways of improving the texture of low fat frozen confection products prepared by conventional freezing through the use of specific emulsifiers. Solutions without such ingredients may be desirable.

Furthermore, air volume, i.e., aeration, may influence certain physical properties of the final frozen dessert product. Aerated frozen desserts, such as frozen ice cream or yogurt, are typically produced by mixing a dessert base mix with a specific volume of air in a continuous chiller to produce aerated, semi-frozen slurry frozen dessert composition. The extent of aeration is typically defined in terms of "overrun." As such, dessert products that have larger overrun percentages are less costly (sold by volume, not weight) and more efficient to produce because they require less base mix and result in optimum volumes of the final dessert product. Unfortunately, whipping (aerating) of yogurt products results with products that are fluffy and not creamy.

Furthermore, currently chilled yogurt products are sold in cups and/or in primary packages that are holding the yogurt, because chilled yogurt is a fluid mass and does not have shape retention. Consumers enjoy consuming natural, clean and healthful products in chilled formats, but also in frozen formats such as bars, cones, cups and other similar formats.

The prior art discloses different ways to produce hand-holdable dairy products.

US2008089991 relates to hand-holdable, gelled dairy products which include one or more gel-forming hydrocolloids that cause the dairy composition to gel under gelling conditions in a manner so as to provide a hand-holdable product.

In WO2011146805 are described refrigerated yogurt products of small size suitable for eating with the fingers which are prepared by providing a frozen yogurt composition in individual serving portions and coating the frozen yogurt portions with a fat based coating that is a solid at 7° C., thereby completely enveloping the frozen yogurt portions.

U.S. Pat. No. 5,308,628 relates to a method of preparing thickener-free consumption ice or ice cream from a mixture of fermented milk constituents, including whey protein-rich products, and sugars, and optionally emulsifying agents, flavoring material and other conventional components by mixing the ingredients and freezing the mixture under aeration in a conventional manner.

US2007178213 provides improvements in aerated milk compositions, such as yogurt based products, and methods for preparation thereof.

GB1141950 relates to the production of yogurt, wherein a yoghurt mix is heat-treated by the injection of live steam to provide a yogurt mix in which the state of the resulting milk protein is very satisfactory for the production of yogurt.

There is also a desire in the market for products which are "better for you". Such products should comprise a minimum of artificial or non-natural ingredients.

Nonetheless, new and further improved methods for making frozen dairy products are sought after, particularly where the products comprise lower fat content. However, the consumer is unwilling to compromise on taste and texture in the frozen confection products.

Hence, there is an unmet need for a method of preparing fermented yogurt products which can be consumed either frozen or thawed, while maintaining textural and sensorial properties.

It is therefore an object of the invention to provide such a method or to at least provide a useful alternative.

SUMMARY OF THE INVENTION

The object of the present invention relates to providing a method of preparing a fermented yogurt product which can be consumed either frozen or thawed, and maintains its creamy texture.

In particular, it is an object of the present invention to provide a yogurt product comprising 50-100% fermented yogurt mix, preferably 80-100%, more preferably 90-100% fermented yogurt mix with no other dairy source added after fermentation, and the degree of overrun of the mix is between 20 to 150% by volume, preferably 30-60%.

Furthermore, it is an object of the present invention to provide a yogurt product, frozen or chilled, which is aerated, natural, low-fat, devoid of emulsifiers and at the same time scoopable, and have an extremely creamy, and smooth texture.

A further object of the present invention is to provide a method to produce a yogurt product with reduced, low or no fat, which has an appealing texture.

In addition, it is an object of the present invention to obtain a yogurt product with improved heat shock resistance. The producers of frozen confection products seek to minimize the vulnerability of the products to heat shock, because this will reduce the cost of maintaining strict low temperatures in the distribution chain.

The inventors of the present invention have surprisingly found that applying a fermentation step in a method for producing frozen confection product leads to a frozen confection product with very high freeze-thaw stability with dense and creamy mouth feel.

The fermentation step leads to coagulation of the protein and formation of an essentially completely coagulated protein system. The essentially completely coagulated protein system has the effect of producing a very stable frozen product, such that even upon freeze-thawing there is little or no syneresis evident. This leads to a unique product which may be produced frozen but which may also be thawed and consumed after thawing with only little to no deterioration of texture.

The term "essentially completely coagulated" means that over 60% of the proteins are coagulated, such as at least 65%, at least 70%, at least 75%, at least 80%, at least 85%, at least 90%.

Without wishing to be bound by theory, it is thought that the protein network binds and holds water, reducing the formation of large ice crystals. By protein aggregation the large milk protein structure in an ingredient mix is broken into smaller proteins, i.e. the proteins are un-folded. These unfolded proteins have the ability to increase the water holding capacity and form a unique 3-D network. Furthermore, protein aggregates form a network that is suspected to entrap water and fat globules and increases mix viscosity to create a uniquely smooth, creamy texture that mimics the presence of higher fat levels.

Accordingly, this is achieved by the features of the independent claims. The dependent claims further develop the central idea of the invention.

Thus, the first aspect of the invention relates to a method of producing a yogurt product comprising 50-100% fermented yogurt mix, preferably 80-100%, more preferably 90-100% fermented yogurt mix, and the degree of overrun of the mix is between 20 to 150% by volume, preferably 30-60%.

Over the recent years, consumers of frozen confections are becoming more and more demanding and conscious about what to eat and consumers tend to prefer products with fewer additives or totally avoid additives. Thus, consumers are more and more seeking products that contain a minimum of ingredients on their label, i.e. have a clean label. By formulating products without emulsifiers, the inventors of the present invention satisfy both consumer needs.

Furthermore, the inventors of the present invention have surprisingly found that by feeding the yogurt mix through a conventional ice-cream freezer when preparing a yogurt product that is frozen, a product with improved sensorial texture is obtained. Furthermore, it is possible by the present invention to prepare a yogurt product with a rich and creamy texture.

Another aspect of the present invention relates to a frozen confection product obtainable by said method.

In general, the various aspects of the invention may be combined and coupled in any way possible within the scope of the invention. These and other aspects, features and/or advantages of the invention will be apparent from and elucidated with reference to the embodiments described hereinafter.

DETAILED DESCRIPTION OF THE INVENTION

Definitions

Prior to discussing the present invention in further details, the following terms and conventions will first be defined:

In the context of the present invention, mentioned percentages are weight/weight percentages unless otherwise stated.

The term "and/or" used in the context of the "X and/or Y" should be interpreted as "X", or "Y", or "X and Y".

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 1 to 8, from 3 to 7, from 4 to 9, from 3.6 to 4.6, from 3.5 to 9.9, and so forth. All references to singular characteristics or limitations of the present invention shall include the corresponding plural characteristic or limitation, and vice versa, unless otherwise specified or clearly implied to the contrary by the context in which the reference is made.

Unless defined otherwise, all technical and scientific terms used herein have the same meaning as commonly understood by one of ordinary skill in the art.

As used in this specification, the words "comprises", "comprising", and similar words, are not to be interpreted in an exclusive or exhaustive sense. In other words, they are intended to mean "including, but not limited to.

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

Yogurt Product:

As used herein, the term "yogurt" includes, but is not limited to, all of those food products meeting the definition as set forth in the U.S. Food and Drug Administration Code of Federal Regulations (CFR) Title 21 Section 131.200, 131.203, and 131.206.

In general, a yogurt can be made from fermentable dairy components that include a dairy base composition, and with live and active cultures.

Dairy base composition(s) for making a yogurt are well known and are described in, e.g., U.S. Pat. No. 4,971,810 (Hoyda et al.); U.S. Pat. No. 5,820,903 (Fleury et al.); U.S. Pat. No. 6,235,320 (Daravingas et al.); U.S. Pat. No. 6,399,122 (Vandeweghe et al.); U.S. Pat. No. 6,740,344 (Murphy et al.); and U.S. Pub. No. 2005/0255192 (Chaudhry et al.).

In general, a dairy base composition includes at least one fermentable dairy ingredient. A fermentable dairy ingredient can include raw milk or a combination of whole milk, skim milk, condensed milk, dry milk (for example, dry milk solids non-fat, or MSNF), whey, cream, and/or such other milk fraction ingredients as buttermilk, whey, lactose, lactalbumins, lactoglobulins, or whey modified by partial or complete removal of lactose and/or minerals, and/or other dairy ingredients to increase the nonfat solids content, which are blended to provide the desired fat and solids content. If desired, the dairy base can include a filled milk component, such as a milk ingredient having a portion supplied by a non-milk ingredient (for example, oil or soybean milk).

Preferably, the fermentable dairy ingredient is composed of bovine milk. However, other milks can be use as a partial or whole substitute for bovine milk, such as camel, goat, sheep or equine milk. In some embodiments, the dairy base can comprise vegetable milk such as soymilk.

The ingredient mix according to the present invention comprises one or more proteins selected from dairy proteins, plant proteins or a combination thereof. Dairy proteins include milk proteins, for example caseins and whey proteins.

Examples of plant proteins include soya protein, pea protein, wheat protein, corn protein, rice protein, proteins from legumes, proteins from cereals and/or grains, protein isolates from nuts and/or seeds.

Fermenting microorganisms include usually, a combination of *Lactobacillus bulgaricus* and *Streptococcus thermophilus* bacteria to begin the fermentation process. In other variations, *Lactobacillus acidophilus* or *L. bifidus* can also be added.

A yogurt product which is frozen has a temperature of below 0° C. The invention also relates to a chilled yogurt product once thawed. Thus, the thawed yogurt product has a temperature of 0-5° C.

In particular embodiments the yogurt product can be consumed frozen or chilled.

In an embodiment of the invention the yogurt product comprises 50-70% fermented yogurt mix preferably 80-100%, more preferably 90-100% fermented yogurt mix, and the degree of overrun of the mix is between 20 to 150% by volume, preferably 30-60%.

Overrun relates to the amount of air whipped in to an ingredient mix for preparing aerated products. Overrun is a term generally recognized for the skilled person within the field of ice cream production. In the present invention overrun is defined as the increase in volume, in percentage, of yogurt over the volume of the mix used to produce that yogurt due to incorporation of air. In other words, if you start off with 1 liter of mix and you make 2.0 liters of yogurt from that, you have increased the volume by 100% (i.e., the overrun is 100%).

In the context of the present invention, the term "aerated" refers to a product which has air cells distributed evenly throughout the product. The air cells or air bubbles can be distributed throughout the product for example by extrusion or whipping air into the product, e.g. whipping of air into an ingredient mix. For example one volume part of air whipped into one volume part of ingredient mix is equal to 100% overrun, as described by Marshall, Goff and Hartel.

An advantage of overrun is that it makes the product scoopable even when frozen.

Fermented Yogurt Mix

In another embodiment of the invention the fermented yogurt mix comprises dairy components, sweetening agents, fermenting microorganisms, stabilizers, water, air. Further ingredients may be added to the ingredient mix, such as calcium and fiber. Alternatively, further ingredients such as flavouring and/or dyes may be added at other points in the method of producing the yogurt product.

In another embodiment of the invention, the yogurt product comprises total solids in an amount of from 24 to 45% by weight.

In another embodiment of the invention, yogurt product comprises 0.5-16% fat by weight. Preferable the yogurt product comprises 1-16% fat by weight.

According to a specific embodiment of the invention, the product essentially consists of natural ingredients.

The term "essentially consist" means that at least 95% of the ingredients have to be natural, such as at least 97%, preferably at least 98%, even more preferably at least 99%.

The term "natural ingredients" refer in the context of the present invention to ingredients of natural origin. These include ingredients which come directly from the field, animals, etc. or which are the result of a physical or microbiological/enzymatic transformation process. These therefore do not include ingredients which are the result of a chemical modification process.

Sweetening Agents

The product of the invention may comprise one or more sweetening agents. Sweetening agent refers to an ingredient or mixture of ingredients which imparts sweetness to the final product. These include natural sugars such as cane sugar, beet sugar, molasses, other plant-derived nutritive sweeteners, and non-nutritive high intensity sweeteners.

Artificial sweeteners are preferably avoided. These include for example aspartame, sucralose and saccharin.

In another embodiment of the invention, the yogurt product comprises sweetening agent in an amount of from 5 to 20% by weight.

Stabilizer System

The product of the invention comprises a stabilizer system. Stabilizer system refers to one or more ingredients which contribute to the stability of the frozen product with respect to ice crystal formation, heat shock resistance, overall texture properties etc. Thus, the stabilizer system may comprise any ingredients which are of structural importance to the frozen confection product.

In an embodiment the stabilizer system consists of natural ingredients. Stabilizers comprise natural starch, guar, gelatine, locust bean gum, xanthan gum, acacia gum, carageenan, pectin and tara gum.

The product of the invention may include a natural stabilizer system such as those described in application EP08171666.4, the entire content of which is expressly incorporated herein by reference hereto.

In an embodiment of the invention the yogurt product comprises optional amount of stabilizers in the range of 0.01-1.0%, preferably 0.01-0.5%.

Chemically modified starches which are used in the art as stabilizers are also preferably avoided. These include for example modified starch, monostarch phosphate, distarch phosphate, phosphate or acetylated distarch phosphate, acetylated starch, acetylated distarch afipate, hydroxyl propyl starch, hydroxypropyl distarch phosphate, acetylated modified starch.

The products of the present invention are preferably essentially free of the preceding synthetic esters and modified starches.

In another embodiment of the invention, the product is essentially or completely free of any emulsifiers.

"Essentially free" means in the context of the present application, that these material are not intentionally added for their conventional property imparting abilities, e.g. emulsifying, although there could be unintended minor amounts present without detracting from the performance of the products. Generally and preferably, the products of the invention will completely devoid of any emulsifiers.

By the term "essentially or completely free" is therefore meant that the product comprise 1% by weight or less of a given compound.

Fat

The yogurt product of the invention may be full-fat, low fat or fat-free. In an embodiment of the invention, the yogurt product normally comprises from 0.5% to 16% fat by weight. In another embodiment of the present invention, the reduced fat yogurt product comprises at most 3.75% fat. In an embodiment of the present invention, the low fat yogurt product comprises between 0.5% to 2% fat. In a further embodiment, the non-fat yogurt product comprises less than 0.5% fat.

In the context of the present invention, the term "fat" should be interpreted broadly and generally relates to one or more triglycerides independent of their melting temperature. The term "fat" comprises both triglycerides that are in liquid form at 25° C., as well as triglycerides that are in solid or semi-solid form at 25° C.

The fat comprised in the ingredient mix may be from any source, such as derived from animal or from plants. In an embodiment the fat is derived from dairy, such as cream, butter, or milk. In a preferred embodiment the fat is milk fat, which adds flavour, color and body/texture to the frozen confection.

Alternatively the ingredient mix does not comprise fat from dairy but from plant sources. Such mixes are termed Mellorine mix and these mixes offer nutritional benefits such as lower saturated fats and lower cholesterol.

Method:

One aspect of the present invention relates to a method of producing a frozen or thawed yogurt product. The method leads to an essentially complete coagulation of the proteins, and thus to improved freeze-thaw stability of the product, higher viscosity, improved shelf life and a creamy texture.

An aspect of the present invention relates to the method of preparing a yogurt product comprising the steps of:
a) Providing a yogurt mix;
b) Blending the mix;
c) Homogenizing the mix;
d) Pasteurising the mix;
e) Heating the mix to 65-85° C. for 15-40 min to denature proteins;
f) Cooling down the mix to specific incubation temperature of the fermentation organism and incubating which is typically 37-45 C with yogurt culture;
g) agitating and cooling the mix to or below 10° C.;
h) between 3-10° C. feeding the mix through an ice-cream freezer to incorporate overrun;
i) optionally hardening the product of step h), and
j) optionally thawing the product from step i) to form a thawed, chilled yogurt product.

Blending

Blending is done by placing all liquid ingredients (milk, cream, condensed milk etc.) in to a blend vat under slow agitation. Dry ingredients are dispersed in water under sheer and then added to the blend vat for mixing with the liquid ingredients.

Homogenizing

Homogenizing can be done either prior to or after pasteurization. It is preferably carried out under standard conditions, such as at a pressure of between 40 and 200 bars, preferably between 100 and 150 bars, more preferably between 120 and 140 bars.

Pasteurization

The pasteurization step may for example be continuous or batch pasteurization.

Continuous pasteurization is performed under standard conditions and may be carried out prior to or after homogenisation. Preferred pasteurisation conditions include heating to a temperature between 70 to 95° C. for from 30 to 120 seconds, such as 74 to 91° C. for 30 to 120 seconds, preferably 81-87° C. for 30 to 90 seconds.

Other examples include heating to a temperature between 75° C. to 90° C., such as between 80° C. to 90° C., even more preferably between 83° C. to 87° C. for a period of 30 to 120 seconds, preferably from 30 to 60 seconds.

Batch Pasteurization is preferably performed by heating to a temperature between 69° C. to 85° C., such as between 70° C. to 80° C. for a period of 30 to 120 minutes.

Fermentation

The method of the invention comprises a fermentation step after the pasteurization step.

Fermentation is achieved by fermentation of a culture side whereby acidic metabolites are formed, and subsequent addition of the side to the ingredient mix, i.e., addition of a fermentation product to the ingredient mix. Alternatively, a culture may be added to the ingredient mix itself and fermented, i.e., fermentation of the ingredient mix.

A culture side typically comprises one or more microorganisms and a substrate upon which said microorganisms can metabolize. The microorganism produces acidic metabolites, which lower the pH of the culture side. When the culture side is added to the ingredient mix it will acidify the ingredient mix.

The microorganisms may be any suitable microorganism, but typically consists of one or more strains of bacteria. Preferably the bacteria comprise *Lactobacillus bulgaricus* and *Streptococcus thermophilus*.

Examples of preferred bacteria include *Lactobacillus bulgaricus, Lactobacillus acidophilus, Lactobacillus casei* and *Lactobacillus rhamnosus, Bifidobacterium* species, *Streptococcus thermophiles*, and combinations thereof.

The microorganisms may be provided in any suitable form, such as for example, in liquid, frozen or freeze-dried form.

In one embodiment the culture side comprises milk and a culture.

In another embodiment of the invention no other dairy source is added to the mix after fermentation.

Agitating and Cooling

Fermentation process is stopped by agitation and cooling of the fermented mix when the titratable acidity of not less than 0.9%, expressed as lactic acid is reached. Titratable acidity is the amount of acid equivalent to the amount of base required for the neutralization under standardized conditions. Acidity is conventionally expressed by the amount of grams of the most abundant acid in 100 g of product. Cooling is stopped when temperature reached 10° C. or below.

The pH may be adjusted by the addition of an acid, wherein the acid comprising lactic acid, citric acid, and other organic acids. This post-pasteurization acidification can only be done after fermentation is completed at the TA of 0.9 or higher.

Freezing

In an embodiment according to the present invention, the freezing under step h) is in combination with incorporating overrun in the mix to an amount of 30-150%. The incorporation of overrun may be performed to an amount of from 30 to 60%.

In an embodiment the freezing step h) is performed by a standard continuous industry freezer, such as a Taylor freezer.

The invention also relates to a method of invention wherein a second freezing step is performed after the freezing step in e). The second freezing step may be for example a low temperature freezing (LTF) or a low temperature extrusion.

Low-temperature extrusion (LTE) is a known process which imparts to the final product a specific and advantageous microstructure. For instance, ice crystal size and air bubble size tend to be smaller than in traditional manufacturing processes. On the other hand, the size of fat globules does not change significantly when LTE process is used. Thus, the inclusion of a second freezing step, which is low temperature freezing, may further improve the texture of the frozen confection product.

One embodiment relates to method according to the invention, wherein the low temperature freezing is performed in a single or twin screw extruder.

In an alternative embodiment, LTE or LTF is not employed. The method of the invention leads to such a high degree of protein coagulation, that it is possible to produce very stable frozen confections with appealing texture, without the use of LTE/LTF.

The inventors of the present invention have surprisingly found that when the fermented yogurt mix is run through an ice cream freezer to add uniform overrun and have a uniform ice-crystal size, the yogurt become freeze-thaw stable with good sensorial properties. There is no syneresis as typically seen with chilled yogurt. The product can be consumed either frozen or thawed, which makes it different from traditional yogurt consumption. This is a surprisingly advantageous characteristic that makes this a versatile yogurt mix to use for sticks, bars (moulded and extruded), sandwiches, cups and bulk and other similar formats. The product is smooth and extremely creamy in sensorial properties, delivering the perception of full fat yogurt (even if it is low-fat). Product has good keeping quality (minimal distribution abuse) and a long shelf life similar to frozen yogurt. A frozen or chilled snack product made with real yogurt can also contain active and live cultures and possibly probiotics is healthier and more appealing to the consumer.

Frozen or Thawed and Chilled Yogurt Product

In an embodiment the invention relates to a method of producing a yogurt product, comprising the step j) thawing the frozen confection product of the method, to form a thawed yogurt product.

The product of the method displays very good freeze-thaw stability, such that the frozen confection product may be consumed frozen or thawed and served at temperatures where it is no longer frozen, with retained creamy texture.

This provides the consumer with flexibility and the choice of in what form to consume the yogurt product.

Products Obtainable by Methods of the Invention

The invention in another aspect relates to a yogurt product obtainable by a method according to the invention.

The products obtainable by the method will contain ingredients in the ingredient mix, as well as any further ingredients added during the method.

In an embodiment of the invention, the product can be sold in a format of a stick, cone, moulded bar, extruded bar, sandwich, cup, frozen snack, in a bulk format, or in a format of a chilled yogurt.

It should be noted that embodiments and features described in the context of one of the aspects of the present invention also apply to the other aspects of the invention.

All patent and non-patent references cited in the present application, are hereby incorporated by reference in their entirety. Any reference to prior art documents in this specification is not to be considered an admission that such prior art is widely known or forms part of the common general knowledge in the field.

The invention will now be described in further details in the following non-limiting examples.

EXAMPLES

The following examples are provided to illustrate the invention and are not intended to limit the scope of the invention.

Example 1

A 100% yogurt product that is frozen with an overrun of 45%

TABLE 1

| Ingredient | Wt % of final product |
|---|---|
| Fat | 2-4 |
| Sugar | 8-12 |
| MSNF | 12-18 |
| Stabilizers | 0.1-1.0 |
| Starch | 0.1-2.0 |
| Total Solids | 28-35 |

The yogurt that is frozen was prepared according to the following:

An ingredient mix comprising 2-4 wt % fat, from 12-18 wt % milk solids-non-fat, from 8-12 wt % sweetening agent, up to 3 wt % of stabilizer was provided.

The ingredient mix was homogenized at a stage one at 1500 psi and at stage two at 500 psi and subsequently pasteurized at 82° C. for 90 seconds. The pasteurized mix was then brought to 71° C. and kept at that temperature for 30 minutes. The mix is then cooled down to 43° C. and fermentation cultures were added. Fermentation was stopped at a titratable acidity of 0.9-1.2 by agitation and cooling of the mix to 10° C. Then the mix was frozen by using a combination of a standard continuous industry freezer and low temperature freezing, containing 45% OR. The final product was put in cups which were then consumed frozen and chilled.

Example 2

A 100% yogurt product that is frozen with an overrun of 30-60%

TABLE 2

| Ingredient | Wt % of final product |
| --- | --- |
| Fat | 2-4 |
| Sugar | 8-12 |
| MSNF | 12-18 |
| Stabilizers | 0.1-0.5 |
| Starch | 0.1-2.0 |
| Total Solids | 28-32 |

The yogurt that is frozen was prepared according to the following:

An ingredient mix comprising 2-4 wt % fat, from 12-18 wt % milk solids-non-fat, from 8-12 wt % sweetening agent, up to 3 wt % of stabilizer was provided.

The ingredient mix was homogenized at a stage one at 1500 psi and at stage two at 500 psi and subsequently pasteurized at 82° C. for 90 seconds. The pasteurized mix was then brought to 71° C. and kept at that temperature for 30 minutes. The mix is then cooled down to 43° C. and fermentation cultures were added. Fermentation was stopped at a titratable acidity of 0.9-1.2 by agitation and cooling of the mix to 10° C. The mix was then mixed with fruit purees and concentrates and was frozen by using a combination of a standard continuous industry freezer and low temperature freezing containing 30-60% OR. The final product was used to make frozen novelties such as extruded bars, mounded bars, sandwiches, etc.

Example 3

A reduced fat yogurt product comprising natural stabilizers such as natural starch, guar and gelatine and no emulsifiers.

TABLE 3

| Ingredient | Wt % of final product |
| --- | --- |
| Sucrose | 10.00 |
| Guar Gum | 0.10 |
| Gelatin | 0.50 |
| Tapioca Starch | 1.00 |
| Fibresol | 0.00 |
| TS % | 30.59 |
| Fat % | 3.00 |
| MSNF % | 16.00 |
| pH | 4.8 |
| TA | 1.2 |

An ingredient mix comprising 3 wt % fat, from 16 wt % milk solids-non-fat, from 10 wt % sucrose, 1.6 wt % of stabilizer was provided. The amount of total solids is 30.59 wt %.

The ingredient mix was homogenized at a stage one at 1500 psi and at stage two at 500 psi and subsequently pasteurized at 82° C. for 90 seconds. The pasteurized mix was then brought to 71° C. and kept at that temperature for 30 minutes. The mix is then cooled down to 43° C. and fermentation cultures were added. Fermentation was stopped at a titratable acidity of 1.2 by agitation and cooling of the mix to 10° C. Then the mix was frozen by using a combination of a standard continuous industry freezer and low temperature freezing containing 45% OR. The final product was used to make frozen novelties or could be consumed chilled.

Example 4

A low fat yogurt product comprising natural stabilizers such as natural starch and guar and no emulsifiers.

TABLE 4

| Ingredient | Wt % of final product |
| --- | --- |
| Sucrose | 7.00 |
| Guar Gum | 0.10 |
| Gelatin | 0.00 |
| Tapioca Starch | 2.00 |
| Fibresol | 0.00 |
| TS % | 24.10 |
| Fat % | 0.50 |
| MSNF % | 15.00 |
| pH | 4.6 |
| TA | 1.17 |

An ingredient mix comprising 0.5 wt % fat, from 15 wt % milk solids-non-fat, from 7 wt % sucrose, 2.1 wt % of stabilizer was provided. The amount of total solids is 24.1 wt %.

The ingredient mix was homogenized at a stage one at 1500 psi and at stage two at 500 psi and subsequently pasteurized at 82° C. for 90 seconds. The pasteurized mix was then brought to 71° C. and kept at that temperature for 30 minutes. The mix is then cooled down to 43° C. and fermentation cultures were added. Fermentation was stopped at a titratable acidity of 1.17 by agitation and cooling of the mix to 10° C. Then the mix was frozen by using a combination of a standard continuous industry freezer and low temperature freezing containing 45% OR. The final product was used to make frozen novelties or could be consumed chilled.

Example 5

A reduced fat yogurt product comprising natural stabilizers such as natural starch and guar and no emulsifiers.

TABLE 5

| Ingredient | Wt % of final product |
| --- | --- |
| Sucrose | 8.00 |
| Guar Gum | 0.10 |
| Gelatin | 0.00 |
| Tapioca Starch | 2.00 |
| Fibresol | 0.00 |
| TS % | 28.14 |
| Fat % | 3.00 |
| MSNF % | 15.00 |
| pH | 4.7 |
| TA | 1.15 |

An ingredient mix comprising 3 wt % fat, from 15 wt % milk solids-non-fat, from 8 wt % sucrose, 2.1 wt % of stabilizer was provided. The amount of total solids is 28.14 wt %.

The ingredient mix was homogenized at a stage one at 1500 psi and at stage two at 500 psi and subsequently pasteurized at 82° C. for 90 seconds. The pasteurized mix was then brought to 71° C. and kept at that temperature for 30 minutes. The mix is then cooled down to 43° C. and fermentation cultures were added. Fermentation was stopped at a titratable acidity of 1.15 by agitation and cooling of the mix to 10° C. Then the mix was frozen by using a combination of a standard continuous industry freezer and low temperature freezing containing 45% OR. The final product was used to make frozen novelties or could be consumed chilled.

The invention claimed is:

1. A method for producing a yogurt product that is frozen comprising the steps of:
    providing a yogurt mix comprising dairy components and at least one component selected from the group consisting of: sweetening agent, stabilizer and water;
    blending the yogurt mix;
    pasteurizing the blended yogurt mix;
    homogenizing the blended yogurt mix before or after the pasteurizing;
    heating the pasteurized and homogenized yogurt mix to 65-85° C. for 15-40 min to denature proteins;
    performing fermentation by cooling the heated yogurt mix to a specific incubation temperature of a fermentation organism and incubating with a yogurt culture comprising the fermentation organism to form a yogurt product that is 90-100% yogurt;
    agitating and cooling the yogurt product that is 90-100% yogurt to have a temperature between 3° C. and 10° C.; and
    freezing the agitated and cooled yogurt product that is 90-100% yogurt by feeding the agitated and cooled yogurt product through an ice-cream freezer to incorporate overrun of 30% to 60%.

2. The method of claim 1, wherein no other dairy source is added to the yogurt product after the fermentation by cooling.

3. The method according to claim 1, wherein no additional sweetener is added after fermentation.

4. The method according to claim 1, wherein the step of freezing the agitated and cooled product through the ice-cream freezer is followed by using the frozen agitated and cooled yogurt product to prepare a product selected from the group consisting of sticks, cones, molded bars, extruded bars, sandwiches, cups, bulk format, frozen snack and a chilled yogurt and the ice cream freezer is a conventional ice-cream freezer.

5. The method according to claim 1, wherein the cooling in the fermentation provides the yogurt mix with a temperature of 37-45° C.

6. The method according to claim 1, further comprising hardening the frozen yogurt product comprising the overrun of 30% to 60%.

7. The method according to claim 6, further comprising thawing the hardened frozen yogurt product comprising the overrun of 30% to 60% to form a thawed, chilled yogurt product.

8. The method according to claim 1, wherein the frozen yogurt product comprises fat in an amount of 0.5 wt. % to 16 wt. % of the frozen yogurt product.

9. The method according to claim 1, wherein the frozen yogurt product consists essentially of natural ingredients.

* * * * *